United States Patent [19]
Yamamoto

[11] Patent Number: 5,624,349
[45] Date of Patent: Apr. 29, 1997

[54] INITIALIZING DEVICE OF SPEED CHANGE CONTROL SYSTEM FOR USE IN CONTINUOUSLY VARIABLE TRANSMISSION FOR AUTOMOTIVE VEHICLE

[75] Inventor: Masahiro Yamamoto, Zama, Japan

[73] Assignee: Nissan Motor Co., Ltd., Kanagawa Pref., Japan

[21] Appl. No.: 578,917

[22] Filed: Dec. 27, 1995

[30] Foreign Application Priority Data

Dec. 27, 1994 [JP] Japan .................. 6-325644

[51] Int. Cl.$^6$ .................. F16H 9/00; F16H 15/00; F16H 61/32
[52] U.S. Cl. .................. 477/46
[58] Field of Search .................. 477/46, 48

[56] References Cited

U.S. PATENT DOCUMENTS

| 4,698,764 | 10/1987 | Inagaki et al. | 477/46 |
| 4,736,655 | 4/1988 | Kumura et al. | 477/46 |

FOREIGN PATENT DOCUMENTS

61-287835  10/1993  Japan .

Primary Examiner—Dirk Wright
Attorney, Agent, or Firm—Lowe, Price, LeBlanc & Becker

[57] ABSTRACT

A controller (17) obtains a target input rotating speed ($N_{is}$) based on a vehicle running speed (VSP) and a throttle valve opening degree (TVO), drives a motor (23) by the use of a corresponding instruction value, and operates a speed change control valve (21) through a link (22). The controller (17) makes the motor (23) rotate to a hardware limit position in a side corresponding to a lower speed ratio side when the vehicle is in a stopping condition, and then makes the motor (23) rotate in the counter direction to return to a position corresponding to the lowest speed change ratio. On this occasion, the instruction value of the motor (23) is initialized to "0" corresponding to the lowest speed change ratio. When the vehicle is in a running condition, an actual speed change ratio is calculated, from which the motor position is inferred. Then, the instruction value of the motor (23) is initialized as a value corresponding to the inferred position thereof. Thus, a switch becomes unless in order to make the motor rotate to the position corresponding to the lowest speed change ratio position, further the initialization is realized not only when the electric power is turned on, so that the times of the initialization can be increased.

8 Claims, 4 Drawing Sheets

INITIALIZING DEVICE OF SPEED CHANGE CONTROL SYSTEM FOR USE IN CONTINUOUSLY VARIABLE TRANSMISSION FOR AUTOMOTIVE VEHICLE

BACKGROUND OF THE INVENTION

1. Field of the Invention

The present invention generally relates to a speed change control system for use in a continuously variable transmission for an automotive vehicle, such as a V-belt type continuously variable transmission, a torodial type continuously variable transmission or the like. More specifically, the present invention relates to an initializing device of the speed change control system for initializing an instruction value for a motor which operates a speed change control value to realize a position of the valve corresponding to a target speed change ration, which initializing is necessary to eliminate an incorrespondence between a rotating position of the motor (i.e. a rotating position of an output element of the motor) and the instruction value for the motor.

2. Description of the Relevant Art

A V-belt type continuously variable transmission will be taken as an example from the continuously variable transmission. A speed change control system of the V-belt type continuously variable transmission, as shown in e.g. the official gazette of Japanese Patent Publication No. 5-78457, calculates a preferably target speed change ratio corresponding to a running condition, to rotate a motor (i.e. to rotate an output element of the motor) such as a step motor, a servo motor or the like based on an instruction value corresponding to the target speed change ration, for operating the speed change control valve so as to realize a stroke position of the valve corresponding to the target speed change ratio. With this operation, the speed change control valve generates a speed change control pressure corresponding to the target speed change ratio to output it. In response to the speed change control pressure, continuous speed changing or speed varying toward the target speed change ratio is carried out in the continuously variable transmission.

By the way, there is a case that the instruction value to the motor becomes incorrespondence with an actual rotating position of the motor. In this case, exact speed change controlling cannot be realized. Accordingly, in the speed change control system for use in the continuously variable transmission, it is conventional to carry out an initialization for making the instruction value to the motor correspond with the actual rotating position of the motor. Thus, there has been proposed, as described in the above-mentioned official gazette, a method of making the motor rotate in one direction at the time when electric power of the device is turned on during stopping of an automotive vehicle mounting the transmission, detecting by a switch that the rotating position of the motor coincides with a reference position to thereby stop the rotation of the motor, and simultaneously with the detection by the switch, initializing the instruction value to the motor to a value corresponding to the reference position.

However, in the above-mentioned known initializing method of the speed change control system, the switch for detecting that the rotating position of the motor coincides with the reference position, is indispensable, so that there are problems that a cost of the system is increased and a possibility cannot be completely eliminated that the initialization is failed due to a breakdown of the switch.

Further, in the known initializing method of the speed change control system, the initialization can be carried out only during stopping of the automotive vehicle in the condition that the electric power is turned on, so that the initialization cannot be carried out so many times. Accordingly, it is difficult to always make the instruction value of the motor correspond with the actual rotating position of the motor.

SUMMARY OF THE INVENTION

It is therefore an object of the present invention to provide an improved initializing device of a speed change control system for use in a continuously variable transmission for an automotive vehicle, for dissolving the above-mentioned problems by making the motor rotate to a reference position without using the above-mentioned switch, and further by initializing the speed change control system not only at the time when electric power of the device is turned on, but also in many times, and even during running of the automotive vehicle in some cases.

In order to achieve the above-mentioned object, an initializing device of a speed change control system for use in a continuously variable transmission for an automotive vehicle, according to the present invention, in which the speed change control system operates a speed change control valve by acting of a motor (i.e. rotating of an output element of the motor) based on an instruction value corresponding to a target speed change ration, to carry out speed change control of the continuously variable transmission with a speed change control pressure outputted by the speed change control valve in response to the operation of the speed change control valve; comprises, a stopping condition detecting means for detecting that the automotive vehicle mounting the continuously variable transmission is in a stopping condition, a motor initializing operation making means for making the motor carry out an initializing operation in which the motor acts in one direction to a hardware limit position and then acts in the other direction to return to a reference position, at least when the stopping condition detecting means detects that the automotive vehicle is in a stopping condition, and a motor instruction value initializing means for initializing the instruction value for the motor corresponding to the reference position, when the initializing operation of the motor made by the motor initializing operation making means is finished.

In the speed change control system, the motor operates the speed change control valve by acting of the motor based on the instruction value corresponding to the target speed change ratio, then the speed change control valve outputs the speed change control pressure in response to the operation of the speed change control valve, to carry out continuous speed change control of the continuously variable transmission with the speed change control pressure.

In the meantime, when the stopping condition detecting means detects that the automotive vehicle mounting the continuously variable transmission is in a stopping condition, in response to a signal from the stopping condition detecting means, the motor initializing operation making means makes the motor carry out an initializing operation in which the motor acts in one direction to the hardware limit position and then acts in the other direction to return to the reference position. Then, the motor instruction value initializing means initializes the instruction value corresponding to the reference position, when the initializing operation of the motor is finished. Thus, the instruction value for the motor can be made to correspond accurately with the acting position of the motor, so that speed change control of the system can also be accurate.

By the way, with the initializing device according to the present invention, since the motor is made to act to the reference position without using a switch, a cost of the speed change control system can be reduced, and a possibility of a failure of initialization due to a breakdown of the switch, can be eliminated, causing a high reliability to the speed change control system.

Further, with the initializing device according to the present invention, since initializing of the speed change control system is carried out not only at the time when electric power of the device is turned on but also at each time the automotive vehicle is stopped running, the instruction value for the motor can be corresponded accurately with the acting position of the motor in also this regard, owing to increasing of initializing times.

In a preferred embodiment according to the present invention, the reference position of the motor is made into an acting position corresponding to a lowest speed change ratio which coincides with a largest value of the speed change ratio of the continuously variable transmission for driving the automotive vehicle.

With the preferred embodiment according to the present invention, since the reference position of the motor is made into the acting position corresponding to the lowest speed change ratio, the motor initializing operation making means makes the motor carry out the initializing operation in which the motor acts in one direction to the hardware limit position and then acts in the other direction to return to the acting position corresponding to the lowest speed change ratio.

By the way, since the speed change ratio is near the lowest speed change ratio i.e. a largest value of the speed change ratio for driving the automotive vehicle in almost cases at the time of stopping of the automotive vehicle when the above-mentioned initialization is carried out, there is no need of so much action for the initializing operation of the motor. Thereby, the initialization of the speed change control system can be completed promptly.

In another preferred embodiment according to the present invention, the motor initializing operation making means is set with a predetermined stopping time for delaying the action of the motor in the other direction to return to the reference position after the motor acted in the one direction to the hardware limit position.

With the preferred embodiment according to the present invention, the motor initializing operation making means makes the motor carry out an initializing operation in which the motor acts in one direction to a hardware limit position, and after the predetermined stopping time has passed, the motor acts in the other direction to return to the reference position. Thereby, an undesirable case that the speed change operation of the speed change control device becoming out of control due to the drastic change of acting direction of the motor, can be effectively prevented, particularly when a temperature of the atmosphere is low by which a viscous resistance of the speed change control valve is increased.

In anther preferred embodiment according to the present invention, the initializing device further comprises;

an actual speed change ratio calculating means for calculating an actual speed change ratio from input and output rotating speed of the continuously variable transmission, a motor acting position inferring means for inferring an acting position of the motor corresponding to the actual speed change ratio calculated by the actual speed change ratio calculating means, and a running condition motor instruction value initializing means for initializing the instruction value for the motor corresponding to the acting position inferred by the motor acting position inferring means, when the automotive vehicle is in a running condition so that the stopping condition detecting means does not detects that the automotive vehicle is in a stopping condition.

With the preferred embodiment according to the present invention, the actual speed change ratio calculating means calculates an actual speed change ratio from input and output rotating speed of the continuously variable transmission which can be detected by e.g. sensors of the speed change control system, the motor acting position inferring means infers an acting position of the motor corresponding to the actual speed change ratio calculated by the actual speed change ratio calculating means. Then, the running condition motor instruction value initializing means initializes the instruction value for the motor corresponding to the acting position inferred by the motor acting position inferring means, when the automotive vehicle is in a running condition so that the stopping condition detecting means does not detects that the automotive vehicle is in a stopping condition.

Thereby, since the speed change control system is initialized not only during a stopping condition but also a running condition of the automotive vehicle, the times of the initialization is increased to that extent, so that the instruction value for the motor can be corresponded with the acting position of the motor more accurately.

BRIEF DESCRIPTION OF THE DRAWINGS

The present invention will now be explained in more detail with reference to a preferred embodiment shown in the attached drawings, in which.

DETAILED EXPLANATION OF THE PREFERRED EMBODIMENT

Figure 1:
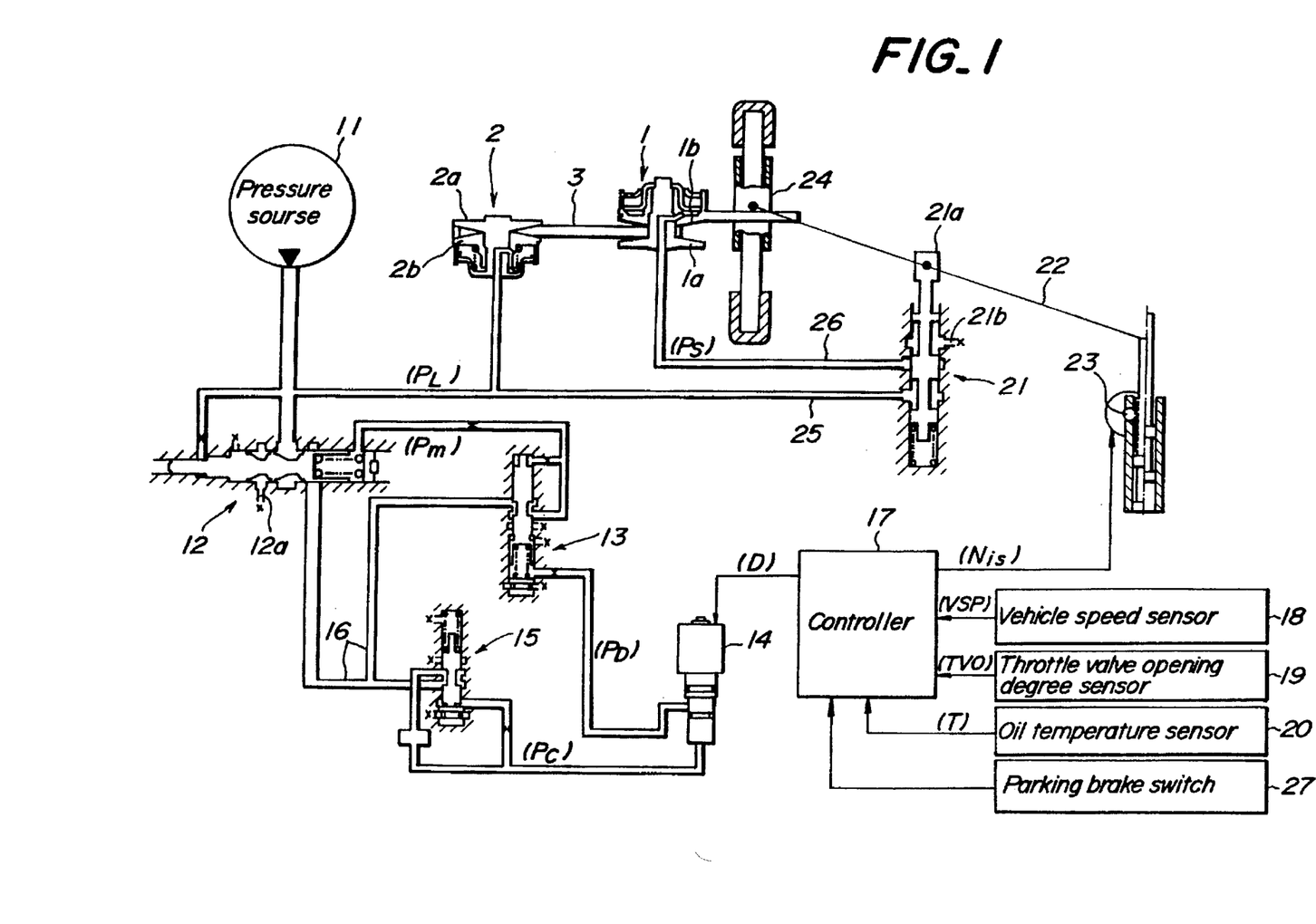
FIG. 1 is a schematic diagram showing one example of a speed change control system for use in a V-belt type continuously variable transmission, including an initializing device as the preferred embodiment according to the present invention.

Referring now to FIG. 1, there is shown an initializing device as the preferred embodiment according to the present invention, which is included in a speed change control system for use in a V-belt type continuously variable transmission for an automotive vehicle. The V-belt type continuously variable transmission comprises a primary pulley 1 as an input pulley to which a rotation of an engine (i.e. a rotation of an output element of the engine) is inputted, and a secondary pulley 2 as an output pulley for outputting a rotation resulted from a speed change action corresponding to a speed change ratio between the pulleys 1, 2. In the V-belt type continuously variable transmission, a transmission system is constituted by wrapping over the primary pulley 1 and the secondary pulley 2 with a V-belt 3 running between the pulleys 1, 2. The V-belt type continuously variable transmission can change a wrapping are radius of the V-belt 3 to each of the pulleys 1, 2 to change continuously a transmitting ratio between the pulleys 1, 2, i.e. the speed change ratio therebetween.

In order to realize such a continuous speed change, the primary pulley 1 is adapted such that a movable flange $1b$ opposing to a fixed flange $1a$ to form a pulley V-groove can be displaced in the axial direction, and the secondary pulley 2 is adapted also such that a movable flange $2b$ opposing to a fixed flange $2a$ to form a pulley V-groove can be displaced in the axial direction. Further, a speed change control pressure $P_S$ is applied to the movable flange $1b$ in a direction to close on the fixed flange $1a$, a line pressure $P_L$ is applied to the movable flange $2b$ in a direction to close on the fixed flange $2a$, and the wrapping are radius of the V-belt 3 to each of the pulleys 1, 2 is changed continuously i.e. steplessly in response to a pressure difference between the speed change control pressure $P_S$ and the line pressure $P_L$, so that the aforementioned continuous speed change is realized.

Hereupon, a line pressure control system for controlling the line pressure $P_L$ will be explained, which is associated with the speed change control system. This line pressure control system is constituted by a pressure source 11, a pressure regulator valve 12 for regulating a pressure of an operating oil supplied from the pressure source 11 to the line pressure $P_L$, a pressure modifier valve 13 for supplying a modifier pressure $P_m$ for controlling the line pressure to the pressure regulator valve 12, a line pressure solenoid 14 for controlling the pressure modifier valve 13, and a pilot valve 15 for supplying a constant pressure $P_c$ to the line pressure solenoid 14.

The pressure regulator valve 12 regulates the pressure of the operating oil from the pressure source 11 to the line pressure $P_L$ corresponding to the modifier pressure $P_m$, while leaking the operating oil to a pass 16 and draining the operating oil from a drain port $12a$ as occasion arises. The pilot valve 15 makes a pressure of the leak oil from the pass 16 into the constant pressure $P_c$ to supply the constant pressure to the line pressure solenoid 14, and the line pressure solenoid 14 makes the constant pressure $P_c$ into a duty pressure $P_D$ corresponding to a driving duty D to put the duty pressure on the pressure modifier valve 13. The pressure modifier valve 13 modifies a pressure of the leak oil from the pass 15 to the modifier pressure $P_m$ corresponding to the duty pressure $P_D$ and hence corresponding to the driving duty D of the line pressure solenoid 14, then puts the modifier pressure on the pressure regulator valve 12, thereby the modifier pressure being used for the aforementioned control of the line pressure $P_L$. Therefore, the line pressure $P_L$ can be controlled by adjusting the driving duty D of the line pressure solenoid 14. The driving duty D is determined by a controller 17 as explained after.

Next, the speed change control system will be explained. The speed change control system is constituted by a speed change control valve 21 for determining the speed change control pressure $P_S$, a speed change link 22 and a stepping motor 23. The speed change link 22 is linked at one end thereof with a shifter 24 which is displaced together with the movable flange $1b$, while the speed change link 22 is connected at the other end thereof to the stepping motor 23 through a rod which is stroked by a rotation as an action of the stepping motor (i.e. a rotation of an output element such as a pinion of the stepping motor) so that the speed change link 22 is rotated about the shifter 24. Further, the speed change link 22 is pivotably connected to a spool $21a$ of the speed change control valve 21 at an intermediate portion between the both ends thereof.

The speed change control valve 21 reduces the line pressure $P_L$ from a line pressure pass 25 to generate the speed change control pressure $P_S$ into a speed change control pass 26. The speed change control valve 21 increases the speed change control pressure $P_S$ by communicating the speed change control pass 26 with the line pressure pass 25 when the spool $21a$ is ascended in FIG. 1, and reduces the speed change control pressure $P_S$ by communicating the speed change control pass 26 with a drain port $21b$ when the spool $21a$ is descended in FIG. 1. Such ascending and descending strokes of the spool $21a$ are controlled by the aforementioned rotation of the stepping motor 23 through the speed change link 22. Besides, a rotating position of the motor 21 is determined by the controller 17, thereby the speed change control is carried out as follows.

Figure 2:
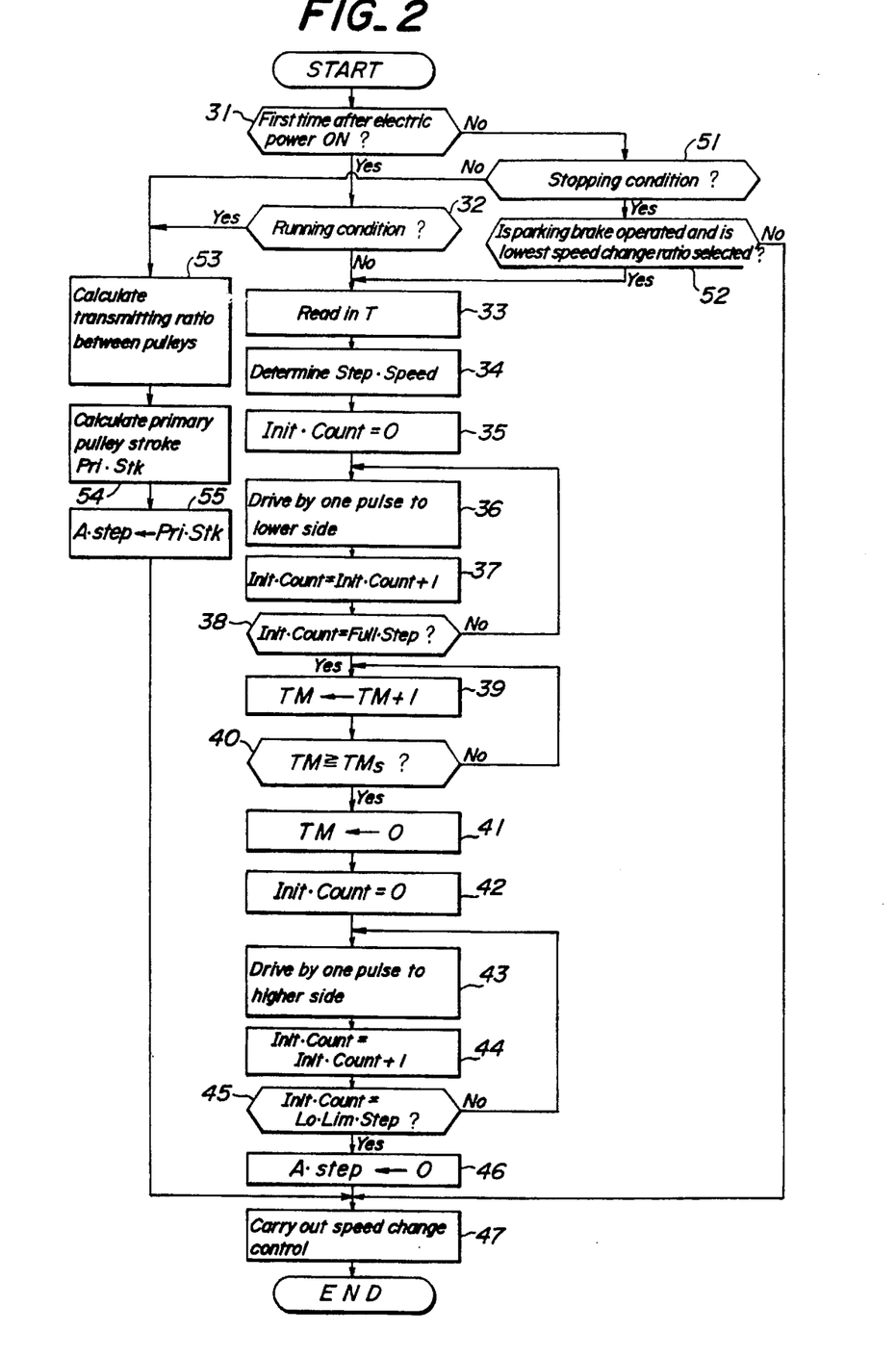
FIG. 2 is a flow-chart showing a control program for initializing and speed change controlling carried by a controller in the speed change control system in FIG. 1.

The controller 17 carrier out a speed change control through the stepping motor 23 and further an initialization of the speed change control system, as clearly shown in FIG. 2, additionally to the line pressure control through the solenoid 14 as mentioned above. Therefore, there are inputted to the controller 17, a signal from a vehicle speed sensor 18 for detecting a vehicle running speed VSP of the automotive vehicle mounting the V-belt type automatic transmission and hence the speed change control system thereon, a signal from a throttle opening degree sensor 19 for detecting a throttle valve opening degree TVO of an engine of the automotive vehicle, a signal from an oil temperature sensor 20 for detecting a temperature T of the operating oil of the V-belt type automatic transmission, and a signal from a parking brake switch 27 which is turned on during a parking brake is operated.

The controller 17 carries out the above-mentioned initialization and the speed change control in accordance with the control program in FIG. 2. First, at a step 31, it is determined whether it is the first time of carrying our or not after an electric power of the controller 17 is turned on, i.e. whether it is the first time of carrying out or not after the engine is started. If it is the first time of carrying out, at a step 32 corresponding to the stopping condition detecting means, it is determined from vehicle running speed VSP whether the automotive vehicle is in a running condition speed VSP whether the automotive vehicle is in a running condition or in a stopping condition. If the automotive vehicle is in a stopping condition, the initialization is carried out as described below.

That is, the oil temperature T is read in at a step 33, and a driving speed Step-Speed of the stepping motor 23 corresponding to the oil temperature T is determined at a step 34. On this occasion, the driving speed Step-Speed of the stepping motor 23 is made slow as the oil temperature becomes low. This control of the driving speed of the stepping motor 23 counteracts a tendency that a viscous resistance of the speed change control valve 21 increases as the oil temperature T becomes low so that a required driving force of the stepping motor 23 becomes large. Thereby, the required driving force of the stepping motor 23 can be maintained in almost constant degree, in spite of decreasing of the oil temperature T.

Next, at a step 35, an initializing counter Init-Count for initializing the stepping motor 23 is reset to "0". Then, at steps 36 to 38, the stepping motor 23 is driven to rotate in one direction by one step at a time with the aforementioned speed Step-Speed so that the aforementioned rod strokes toward a side corresponding to a lowest speed change ration side (i.e. a side of the largest value of the speed change ratio) shown in FIG. 3, and this initializing drive is continued until it is determined at the step 38 that the initializing counter Init-Count incremented at a step 37 is made into a count value Full-Step corresponding to a hardware limit position of stroking of the rod and hence a hardware limit position of rotating of the stepping motor in a hardware limits thereof, near a rotating position corresponding to the lowest speed change ratio (i.e. the largest value of the speed change ratio) shown in FIG. 3. Thereby, the stepping motor 23 once is made to rotate until a rotating position of the stepping motor locates at the hardware limit position in a side corresponding to the lowest speed change ratio side (the lowest position in the hardware limits of the stepping motor in FIG. 3). It is to be noted that the counter name such as the lowest speed change ratio corresponding to the largest value of the speed change ratio is originated from a conventional gear shifting type transmission in which the gear providing the largest value of speed change ratio is called as the low gear.

Figure 3:
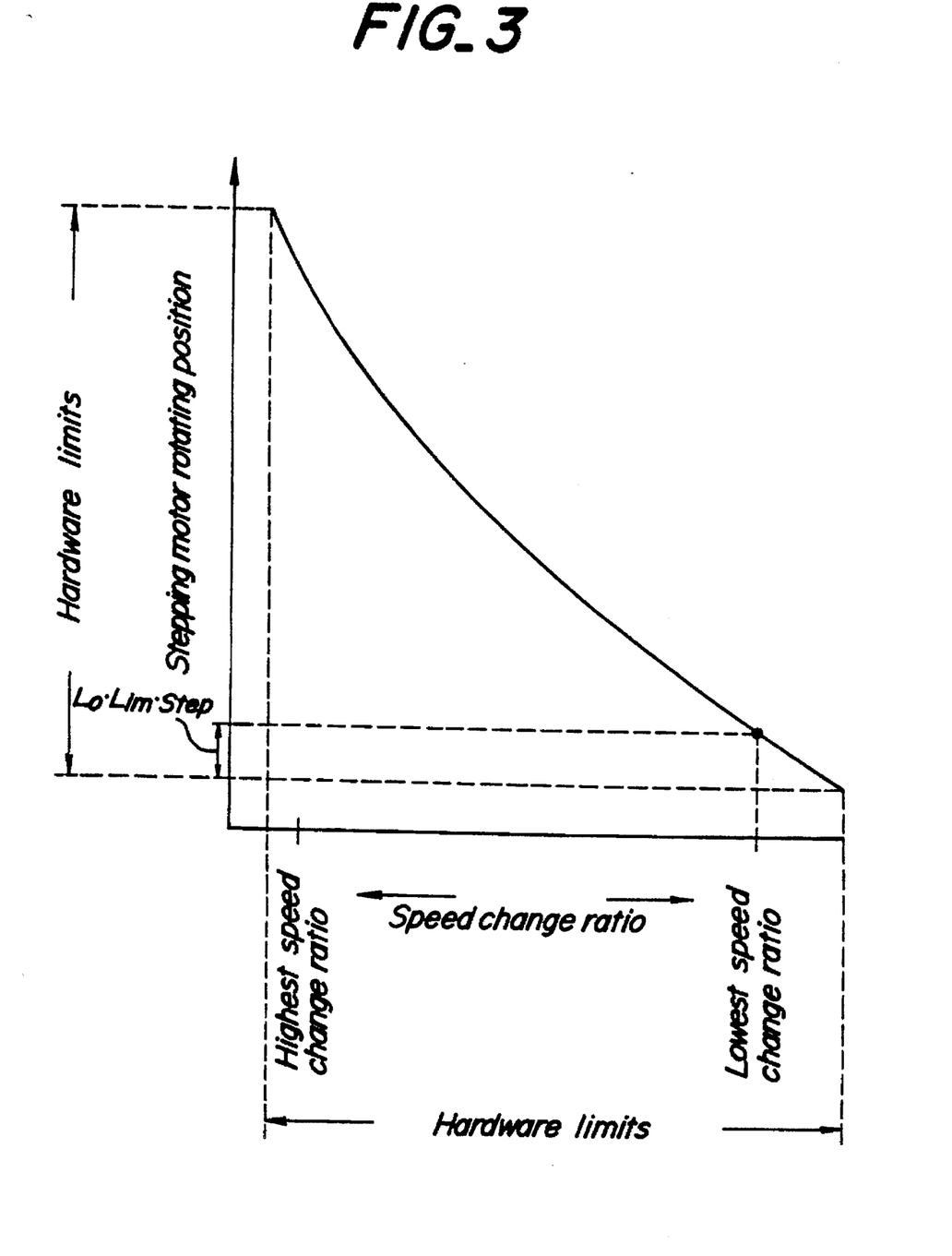
FIG. 3 is a diagram showing a relation between a speed change ratio and a step motor stroke with reference to the speed change control system in FIG. 1.

On this occasion, the count value Full-Step is a constant value, and has been determined to such a value that a rotating position of the stepping motor 23 locates at the hardware limit position in a side corresponding to the lowest speed change ratio side when the initializing counter Init-Count is made into the count value Full-Step, even in case of that the rotating position of the step motor 23 has been located at another hardware limit position in another side corresponding to the highest speed change ratio side (the highest position in the hardware limits of the stepping motor in FIG. 3) at the step 35.

Accordingly, when a rotating position of the stepping motor 23 has been already located at the side corresponding to the lowest speed change ratio side or the like at the step 35, the stepping motor 23 reaches the hardware limit position in the side corresponding to the lowest speed change ratio side before the initializing counter Init-Count is made into the count value Full-Step, and then the process of the steps 36 to 38 is continued thereafter. However, during the process of the steps 36 to 38 after the stepping motor 23 reaches the hardware limit position in the side corresponding to the lowest speed change ratio side, in spite of being instructed to rotate, the stepping motor 23 remains the rotating position at the hardware limit position due to the operation becoming out of control.

The time passed from finishing of the process of the steps 36 to 38 is measured by a timer TM which is incremented at a step 39 and reset at a step 41. When the timer TM turns out to represent a predetermined stopping time $TM_S$ at a step 40, that is, when the stopping time $TM_S$ has passed from the time at which the stepping motor 23 being locate at the limit position in the side corresponding to the lowest speed change ratio side, the stepping motor 23 is driven to rotate in the other direction so that the aforementioned rod strokes toward the other side corresponding to the highest speed change ratio side (i.e. a side of the smallest value of the speed change ratio) shown in FIG. 3, at steps 42 to 45.

That is, at the step 42, the above-mentioned initializing counter Init-Count is reset to "0", then the stepping motor 23 is driven to return rotating in the other direction by one step at a time with the aforementioned speed Step-Speed, and this initializing drive is continued until it is determined at the step 45 that the initializing counter Init-Count incremented at a step 44 is made into a count value Lo-Lim-Step corresponding to a rotating position of the stepping motor which, in turn, corresponding to the lowest speed change ratio (i.e. the largest value of the speed change ratio) in the hardware limits thereof shown in FIG. 3. Thereby, the rotating position of the stepping motor is made to return to the position corresponding to the lowest speed change ratio.

Accordingly, the steps 35 to 45 correspond to the motor initializing operation making means.

As mentioned above, the initializing drive of the stepping motor 23 is carried out. The, in this condition that the rotating position of the stepping motor 23 has been made to correspond to the lowest speed change ratio, in instruction value A-step for the stepping motor 23 is initialized to be "0" so as to corresponding to the lowest speed change ratio at the step 46 which corresponds to a motor instruction value initializing means. Thus, the instruction value A-step for the stepping motor 23 is corresponded to the rotating position of the stepping motor 23, and the speed change control based thereon can be carried out accurately.

Figure 4:
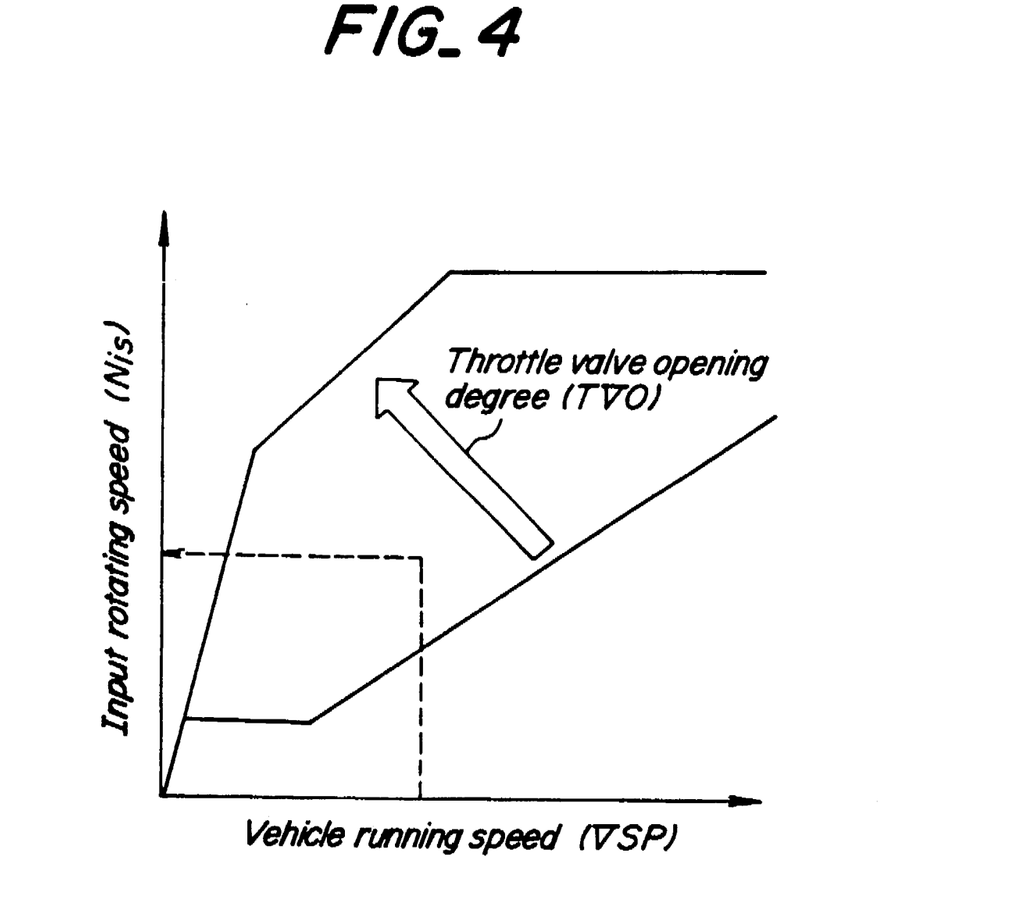
FIG. 4 is a pattern diagram showing a speed change control characteristic which is used for speed change controlling in the speed change control system in FIG. 1.

The speed change control will be explained hereinafter. The speed change control is carried out at a step 47 in FIG. 2. For carrying out the speed change control, the controller 17 obtains a target input rotating speed (unit of which may be revolutions per minute) $N_{is}$ from the read-in vehicle running speed VSP and the read-in throttle valve opening degree TVO based on a map corresponding to e.g. a speed change control characteristic shown in FIG. 4, and determines a target rotating position of the stepping motor 23 corresponding to the target input rotating speed $n_{is}$ as the instruction value A-step, then directs the stepping motor 23 to rotate in accordance with the instruction value A-step. Hereupon, the stepping motor 23 is made to rotate to the aforementioned rotating position with the aforementioned speed Step-Speed. Thereby, the stepping motor 23 rotates the link 22 about the shifter 24, and makes the spool 21a of the speed change control valve 21 to stroke to a corresponding position. Therefore, the speed change control valve 21 changes the speed change control pressure $P_S$, so that the movable flanges 1b, 2b of the both pulleys 1, 2 are displaced and the speed change ratio caused by the pulleys is made into a speed change ratio corresponding to the aforementioned target input rotating speed $N_{is}$.

As this speed changing advances, the movable flange 1b of the primary pulley 1 moves the speed change link 22 through the shifter 24 to rotate about the rod driven by the stepping motor 23 so as to return the spool 21a of the speed change control valve 21 to an initial stroke position. Thus, the speed change control is finished when the speed change ratio caused by the pulleys is made into a speed change ratio corresponding to the aforementioned target input rotating speed $N_{is}$, and this speed change ratio can be maintained.

Incidentally, for controlling the line pressure $P_L$, through it is not shown in the attached drawings, the controller 17 obtains a target line pressure from the aforementioned speed change ratio and the throttle valve opening degree TVO based on a map corresponding to a line pressure control characteristic which is defined by a speed change ratio and a throttle valve opening degree TVO, and drives the line pressure solenoid 14 with the driving duty D corresponding to the target line pressure, to thereby control the line pressure $P_L$. The solenoid 14 makes the constant pressure $P_c$ from the pilot valve 15 into the duty pressure $P_D$ corresponding to the driving duty D, to put it on the modifier valve 13, the modifier valve 13 puts the modifier pressure $P_m$ corresponding to the duty D on the pressure regulator valve 12, then the pressure regulator valve 12 adjusts a pressure of the operating oil from the pressure 11 to the line pressure $p_L$ corresponding to the duty D. As mentioned above, the line pressure $P_L$ is controlled in line with the predetermined line pressure control characteristic.

Further, the initialization of the aforementioned instruction valve A-step for the motor at the steps 35 to 46 in FIG. 2 is carried out at each time when it is determined that the automotive vehicle is in a stopping condition from the vehicle running speed VSP at a step 51 which also corresponds to the stopping condition detecting means, and further it is determined at a step 52 that the parking break switch 27 is turned on (i.e. the parking brake is operated) and the lowest speed change ratio is selected, even if it turns out to be determined at the step 31 that it is not the first time after the electric source is turned on.

Furthermore, when it is determined at the step 32 or 51 that the automotive vehicle is running (i.e. not in a stopping condition), the initialization of the instruction valve A-step for the motor is carried out as follows, in spite of whether it is the first time after the electric source is turned on, or not. That is, fist, at a step 53 corresponding to the actual speed change ratio calculating means, a transmitting ratio between the pulleys (i.e. actual speed change ratio) is calculated from input and output rotating speed of the continuously variable transmission which can be detected by e.g. sensors of the speed change control system, and a stroke Pri-Stk of the movable flange 1b of the primary pulley 1 is inferred based on the transmitting ratio between the pulleys at a step 54 corresponding to the the motor acting position inferring means, then the instruction valve A-step for the motor is initialized as a value corresponding to the stroke Pri-Stk at a step 55 corresponding to the running condition motor instruction value initializing means.

The foregoing description is by way of example only, and not intended to limit the scope of the appended claims.

I claim:

1. An initializing device of a speed change control system for use in a continuously variable transmission for an automotive vehicle according to the present invention, in which said speed change control system operates a speed change control valve by acting of a motor based on an instruction value corresponding to a target speed change ratio, to carry out speed change control of said continuously variable transmission with a speed change control pressure outputted by said speed change control valve in response to said operation of said speed change control valve; comprising, a stopping condition detecting means for detecting that said automotive vehicle mounting said continuously variable transmission is in a stopping condition, a motor initializing operation making means for making said motor carry out an initializing operation in which said motor acts in one direction to a hardware limit position and then acts in the other direction to return to a reference position, at least when said stopping condition detecting means detects that said automotive vehicle is in a stopping condition, and a motor instruction value initializing means for initializing said instruction value for said motor corresponding to said reference position, when said initializing operation of said motor made by said motor initializing operation making means is finished.

2. An initializing device of a speed change control system according to claim 1, wherein, said reference position of said motor is made into an acting position corresponding to a lowest speed change ration which coincides with a largest value of said speed change ratio of said continuously variable transmission for driving said automotive vehicle.

3. An initializing device of a speed change control system according to claim 1, wherein, said motor initializing operation making means is set with a predetermined stopping time for delaying said action of said motor in the other direction to return to said reference position after said motor acted in said one direction to said hardware limit position.

4. An initializing device of a speed change control system according to claim 2, wherein said motor initializing operation making means is set with a predetermined stopping time for delaying said action of said motor in the other direction to return to said reference position after said motor acted in said one direction to said hardware limit position.

5. As initializing device of a speed change control system according to claim 1, wherein, said initializing device further comprising:

an actual speed change ratio calculating means for calculating an actual speed change ratio from input and output rotating speed of said continuously variable transmission, a motor acting position inferring means for inferring an acting position of said motor corresponding to said actual speed change ratio calculated by said actual speed change ratio calculating means, and a running condition motor instruction value initializing means for initializing said instruction value for said motor corresponding to said acting position inferred by said motor acting position inferring means, when said automotive vehicle is in a running condition so that said stopping condition detecting means does not detects that said automotive vehicle is in a stopping condition.

6. An initializing device of a speed change control system according to claim 2, wherein, said initializing device further comprising;

an actual speed change ratio calculating means for calculating an actual speed change ratio from input and output rotating speed of said continuously variable transmission, a motor acting position inferring means for inferring an acting position of said motor corresponding to said actual speed change ratio calculated by said actual speed change ratio calculating means, and a running condition motor instruction value initializing means for initializing said instruction value for said motor corresponding to said acting position inferred by said motor acting position inferring means, when said automotive vehicle is in a running condition so that said stopping condition detecting means does not detects that said automotive vehicle is in a stopping condition.

7. An initializing device of a speed change control system according to claim 3, wherein, said initializing device further comprising;

an actual speed change ratio calculating means for calculating an actual speed change ratio from input and output rotating speed of said continuously variable transmission, a motor acting position inferring means for inferring an acting position of said motor corresponding to said actual speed change ratio calculated by said actual speed change ratio calculating means, and a running condition motor instruction value initializing means for initializing said instruction value for said motor corresponding to said acting position inferred by said motor acting position inferring means, when said automotive vehicle is in a running condition so that said stopping condition detecting means does not detects that said automotive vehicle is in a stopping condition.

8. An initializing device of a speed change control system according to claim 4, wherein, said initializing device further comprising;

an actual speed change ratio calculating means for calculating an actual speed change ratio from input and output rotating speed of said continuously variable transmission, a motor acting position inferring means for inferring an acting position of said motor corresponding to said actual speed change ratio calculated by said actual speed change ratio calculating means, and a running condition motor instruction value initializing means for initializing said instruction value for said motor corresponding to said acting position inferred by said motor acting position inferring means, when said automotive vehicle is in a running condition so that said stopping condition detecting means does not detects that said automotive vehicle is in a stopping condition.

\* \* \* \* \*